United States Patent [19]

Shimp

[11] Patent Number: 4,590,051

[45] Date of Patent: May 20, 1986

[54] SODIUM TRIPOLYPHOSPHATE MANUFACTURE

[75] Inventor: Lawrence A. Shimp, Robbinsville, N.J.

[73] Assignee: FMC Corporation, Philadelphia, Pa.

[21] Appl. No.: 666,932

[22] Filed: Oct. 31, 1984

[51] Int. Cl.$^4$ .............................................. C01B 25/30
[52] U.S. Cl. ....................................................... 423/315
[58] Field of Search ............................................ 423/315

[56] References Cited

U.S. PATENT DOCUMENTS

| | | | |
|---|---|---|---|
| T890,012 | 9/1971 | Frazier | 71/34 |
| 3,423,170 | 1/1969 | Edwards | 23/107 |
| 3,449,068 | 6/1969 | Hartlapp et al. | 23/105 |
| 4,209,497 | 6/1980 | Irani et al. | 423/315 |
| 4,330,516 | 5/1982 | Winand | 423/321 S |
| 4,420,321 | 12/1983 | Wilson | 71/43 |
| 4,431,620 | 2/1984 | Schenck et al. | 423/315 |

FOREIGN PATENT DOCUMENTS 1133045 11/1968 United Kingdom ................ 423/315

*Primary Examiner*—John Doll
*Assistant Examiner*—Wayne A. Langel
*Attorney, Agent, or Firm*—Frank Ianno; Eugene G. Seems

[57] ABSTRACT

In the manufacture of sodium tripolyphosphate, the make up liquor containing the requisite sodium and phosphorus values, is treated with from about 0.01 to 0.1 weight percent of hydrogen peroxide before the liquor is heated to form sodium tripolyphosphate. The hydrogen peroxide treatment prevents dark oily impurities from forming on the surface of aqueous solutions of the sodium tripolyphosphate thus treated.

5 Claims, No Drawings

SODIUM TRIPOLYPHOSPHATE MANUFACTURE

This invention relates to a method for obtaining a purified sodium tripolyphosphate product, and more particularly to preventing the presence of dark oil impurities from forming on the surface of aqueous sodium tripolyphosphate solutions.

Sodium tripolyphosphate ($Na_5P_3O_{10}$) is widely employed as a food additive in meats and other foodstuffs. One method for producing sodium tripolyphosphate product is to react phosphoric acid and an alkaline compound such as sodium hydroxide or sodium carbonate together in an aqueous solution such that the mole ratio of sodium to phosphorus is on the order of about 1.67:1. This reaction results in the formation of an aqueous mixture (also called "make up liquor") containing the equivalent of monosodium orthophosphate and disodium orthophosphate in a mole ratio of 1:2. The free water is removed from the above phosphate solution by passing the liquid into a heating zone where it is progressively heated to a temperature of about 350° C. or higher, during which sodium tripolyphosphate is formed. The exact mole ratio of sodium to phosphorus which is employed may be varied to suit the individual needs of the producer. The ultimate reaction may be considered as proceeding according to the following:

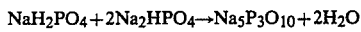

$$NaH_2PO_4 + 2Na_2HPO_4 \rightarrow Na_5P_3O_{10} + 2H_2O$$

The resulting tripolyphosphate which is formed is a crystalline anhydrous product, capable of having two distinct crystalline forms. Form I is produced at temperatures of from about 500° C. to 620° C. while Form II is produced at temperatures below about 500° C. Sodium tripolyphosphate granular product is made up conventionally of an intimate mixture of Form I and Form II crystalline configurations. The proportion of Form I to Form II can be adjusted where desired to suit the needs of the specific application.

The product coming from the heating apparatus is generally in agglomerated form. The agglomerates are cooled and sized to yield a sodium tripolyphosphate product which is separated into granules having a size greater than about 100 mesh (and preferably about 0.005–0.50 inch in diameter), and a more finely powdered sodium tripolyphosphate, which is sold as a separate product.

A most serious problem that has arisen with sodium tripolyphosphate intended for food use is that when the sodium tripolyphosphate is dissolved in water, spots of a dark oily deposit often form on the surface of the solution. These dark oil deposits are insoluble in the aqueous solution, and their presence is sufficient to make the sodium tripolyphosphate unacceptable in food applications.

The source of the dark oily contamination is not known, although it is believed that it may come from the soda ash used as a feed material. Further, filtration of the make up liquor does not solve the problem because these impurities are soluble in the make up liquor. Apparently, the impurities do not become insoluble in water until the make up liquor containing them has been passed through the heating zone and been converted to sodium tripolyphosphate. To further aggravate the problem, the presence of these impurities is not detectable by any coloration of the sodium tripolyphosphate product. The product may have a perfectly acceptable white color and, when dissolved, may still exhibit these oily impurities.

I have now found that sodium tripolyphosphate free of the above impurities can be produced by forming a make up liquor of sodium orthophosphate having an Na:P ratio of about 5:3 and heating it in a heating zone to produce sodium tripolyphosphate, the improvement comprising adding to said make up liquor from about 0.01 to about 0.1 weight percent of hydrogen peroxide, based on the final weight of the sodium tripolyphosphate produced, and allowing the treated make up liquor to remain for at least about 30 minutes before being heated in said heating zone, whereby dark oily residues are prevented from forming on the surface of aqueous solutions of said sodium tripolyphosphate.

The method of operation of the added hydrogen peroxide operates is not known. Apparently, the hydrogen peroxide reacts with the soluble form of the impurities in the make up liquor to form a reaction product that does not convert to the insoluble dark oily contaminant obtainable in the absence of this treatment. It is clear, however, that the peroxide does not act merely as a bleaching agent, since the original make up solution containing the impurities and resulting sodium tripolyphosphate are not originally stained or off-color.

In carrying out the present invention, the hydrogen peroxide is added to the make up liquor in amounts of about 0.01 to about 0.1 weight percent hydrogen peroxide, based on the final weight of the sodium tripolyphosphate product obtained. The hydrogen peroxide can be added to the make up liquor at any point prior to calcination of the liquor. The concentration of the hydrogen peroxide employed may vary from 30% up to 90% by weight. In general practice, it is preferable to use concentrations of hydrogen peroxide in the 30% to 50% by weight range since these are the most common strengths of hydrogen peroxide sold in the marketplace. Further, since the amount of hydrogen peroxide being added is very small the more dilute concentrations make it easier to measure and add the requisite amount of hydrogen peroxide.

Other peroxygen compounds, other than hydrogen peroxide, are not suitable for this application, because of the residues they leave behind. In the case of hydrogen peroxide, the residue is only water and this is not objectionable in food-stuff.

The reaction between the hydrogen peroxide and the impurities occurs in a relatively short period of time on the order from about 30 minutes to about 4 hours. In general, after the hydrogen peroxide has been added to the make up solution, the resulting solution is held at a temperature of from about 90° C. to about 100° C., and allowed to remain at this temperature for a time period of from about 30 minutes to about 4 hours. The thus treated make up solution is then sent to the heating stage for conversion to tripolyphosphate. For convenience and economy, the hydrogen peroxide is preferably added in form of a 30% aqueous solution.

The following examples are given to illustrate the present invention but are not deemed to be limiting thereof.

EXAMPLE I—Prior Art Process

A charge of 8,500 gallons of make up liquor, made by reacting phosphoric acid and soda ash in an Na:P ratio of about 5:3, was placed in feed tank and maintained at 90° C. to 100° C. This was fed to a gas fired rotary calciner, having a product discharge temperature of between 500° C. to 600° C., at a rate of 15,000 pounds/hour to produce sodium tripolyphosphate. The sodium tripolyphosphate color was observed and evaluated for color visually against a standard on a pass/fail basis. Any deviation in white color failed. Formation of dark oil upon dissolving was measured in two ways: A pass/fail test consisted of dissolving 30 pounds of the sodium tripolyphosphate in 40 gallons of water and observing for any visible oil spots. A quantitative laboratory test was carried out by passing 200 grams of product per 1,000 ml of water through a standard milk sediment test pad. The pad was compared to an appropriate standard (American Public Health Association) chart, and a reading in parts per million of contaminants was obtained. A reading 2.0 ppm or less is acceptable and will correlate with passing the 40-gallon dissolving test.

In this Example, the color of the sodium tripolyphosphate was acceptably white. The 40-gallon dissolving tests showed unacceptable dark oily deposits on the surface of the solution. The milk sediment pad test showed an unacceptable 15 ppm residue of contaminants.

EXAMPLE II—Prior Art Process With Filtration

The procedure of Example I was repeated except that the make up liquor was filtered with a multileaf pressure filter, coated with Celite filter aid, before being fed to the calciner. The sodium tripolyphosphate product had an acceptable white color. The resulting milk sediment pad test showed an unacceptable residue of 7.5 ppm.

EXAMPLE III—Hydrogen Peroxide Treated

The procedure of Example I was repeated except that 70 gallons of a 30% aqueous hydrogen peroxide solution was added to the feed tank and the treated liquor in the tank allowed to stand for at least 30 minutes, with some remaining up to 4 hours, before feeding the treated make up liquor to the calciner. The color of the sodium tripolyphosphate was acceptably white. An aqueous solution thereof was free of dark oily spots in the 40-gallon dissolving test and yielded a milk sediment pad residue of 0.5 ppm.

EXAMPLE IV—Hydrogen Peroxide Treated

The procedure of Example I was repeated except that 20 gallons of a 30% aqueous hydrogen peroxide solution was added to the feed tank and the treated make up liquor allowed to stand for a minimum of 30 minutes before being sent to the calciner. The resulting sodium tripolyphosphate was of acceptably white color, gave a solution in the 40-gallon test that was free of dark oily spots, and had a milk sediment pad residue of 1.0 pm.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of producing sodium tripolyphosphate wherein a make up liquor of sodium orthophosphate is made up having an Na:P ratio of about 5:3 and heated in a heating zone to produce sodium tripolyphosphate, the improvement comprising adding to said make up liquor from about 0.01 to about 0.1 weight percent of hydrogen peroxide, based on the final weight of the sodium tripolyphosphate produced, and allowing the treated make up liquor to remain for at least about 30 minutes before being heated in said heating zone, whereby dark oily residues are prevented from forming on the surface of an aqueous solution of said sodium tripolyphosphate.

2. Process of claim 1 wherein said treated make up liquor is allowed to remain for about 30 minutes to about 4 hours.

3. Process of claim 1 wherein the hydrogen peroxide employed is a 30 weight percent aqueous solution of hydrogen peroxide.

4. Process of claim 1 wherein the heating zone is a calciner and the sodium tripolyphosphate exiting from the calciner is at a temperature of from about 500° C. to 600° C.

5. Process of claim 1 wherein said make up liquor is maintained at a temperature of about 90° C. to about 100° C. after addition of said hydrogen peroxide.

* * * * *